United States Patent [19]
Dispenza

[11] Patent Number: 5,626,162
[45] Date of Patent: May 6, 1997

[54] WATER CONTROL GAUGE

[76] Inventor: A. Charles Dispenza, 29970 Lower Valley Rd. P.O. Box 4400-103, Tehachapi, Calif. 93561

[21] Appl. No.: 613,113

[22] Filed: Mar. 8, 1996

[51] Int. Cl.⁶ .................. F16K 17/36; F16K 21/18
[52] U.S. Cl. .................. 137/78.2; 137/135; 137/389
[58] Field of Search .................. 137/78.2, 135, 137/132, 389

[56] References Cited

U.S. PATENT DOCUMENTS

| | | | |
|---|---|---|---|
| 814,208 | 3/1906 | Hogan | 137/315 |
| 2,604,112 | 7/1952 | Thorsheim | 137/389 |
| 4,421,459 | 12/1983 | Frey | 137/389 |
| 4,919,165 | 4/1990 | Lloyd | 137/78.2 |
| 5,400,815 | 3/1995 | Whitehill | 137/78.2 |

FOREIGN PATENT DOCUMENTS 2074295  10/1981  United Kingdom .................. 137/78.2

*Primary Examiner*—A. Michael Chambers
*Attorney, Agent, or Firm*—Dennis W. Beech

[57] ABSTRACT

The water control gauge is a cylindrical reservoir for collecting water from rain, sprinklers and other airborne sources. The reservoir has a float measurer to measure the level of water collected in the reservoir. A pulley having a float detects the water level and the turning of the wheel of the pulley operates an electric switch to allow or inhibit the operation of a sprinkler system. A siphon is attached to the reservoir to drain the water once a predetermined level has been reached.

10 Claims, 3 Drawing Sheets

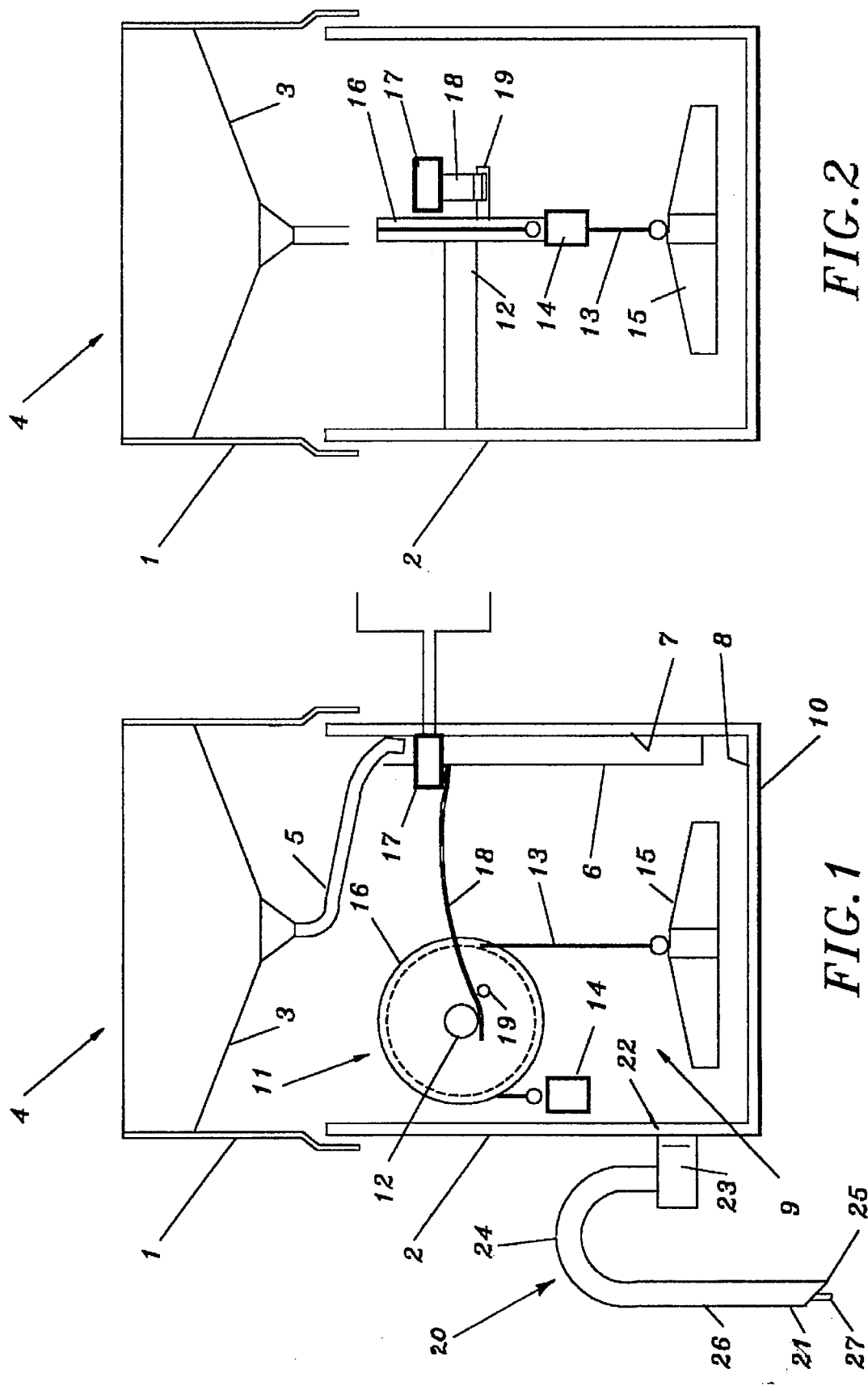

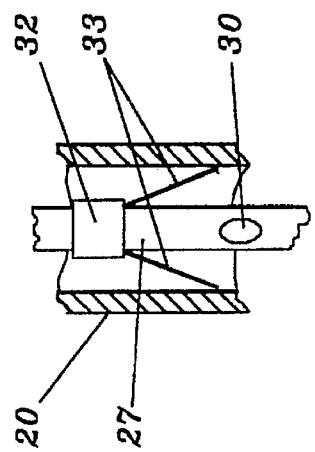
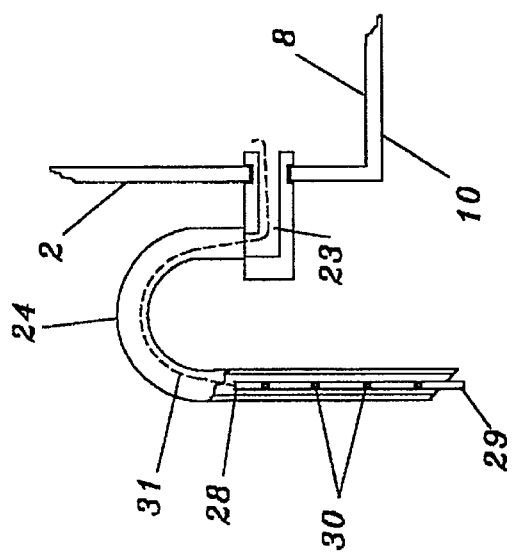
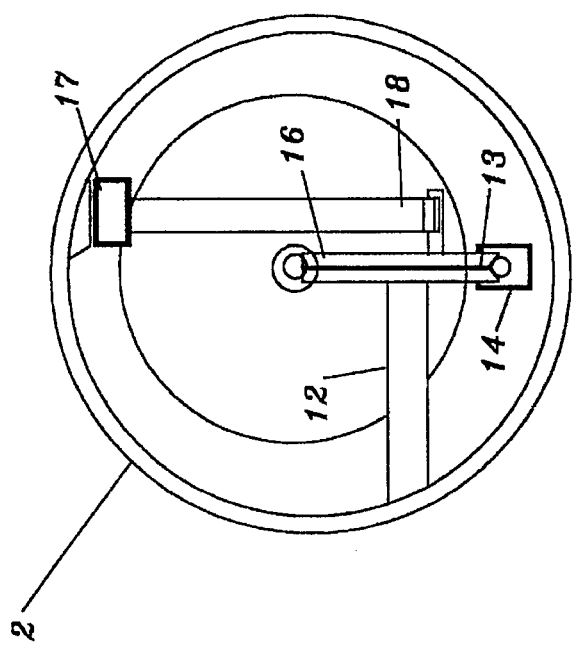

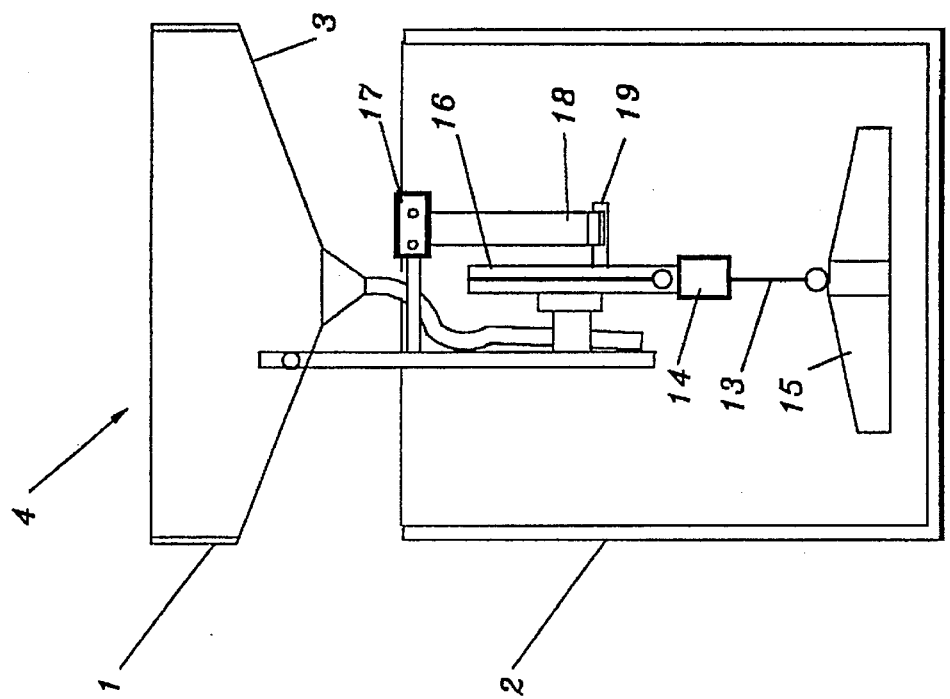
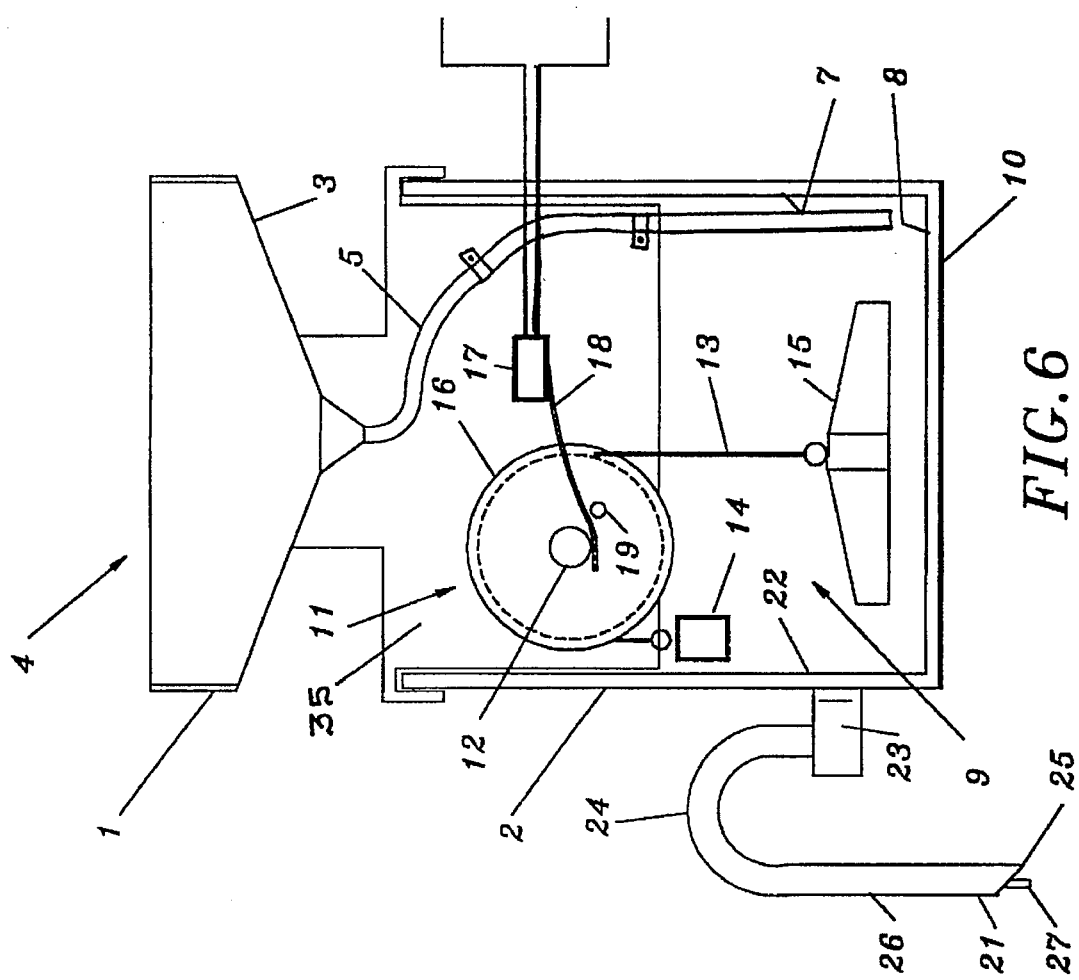

WATER CONTROL GAUGE

BACKGROUND OF THE INVENTION

1. Field of the Invention

This invention relates to devices used to measure water precipitation and control water usage for irrigation purposes. The new device collects and measures water from rain, sprinklers and other airborne sources. Based on the amount of precipitation an automated watering system is controlled to allow irrigation of a selected site.

2. Description of Related Art

There are currently in use various devices to automatically control the irrigation of yards, fields, golf courses, etc. Normally such automated systems depend on a time control mechanism which automatically causes water to be spread, sprayed or sprinkled over the area to be irrigated. This form of control provides for irrigation to be accomplished at specific times for a fixed duration without the need for human intervention.

However, such systems lack the ability to measure the need for irrigation at any particular time based on such factors as rainfall, evaporation, temperature, etc. This creates situations often seen where a sprinkler system is dispensing water in the middle of a rain storm. Also excess watering may occur due to climatic conditions such as humidity. The most common solution to this problem requires human intervention to check the over or under use of water for irrigation. Some moisture detection devices may also be embedded in the ground in attempts to monitor the soil moisture content.

The present invention provides a simple method to measure the amount of water precipitation from water sources in the area of the irrigation control system. Based on this water measure the automated timing control system is allowed or inhibited from activating the dispensing of water from the irrigation system. The water control gauge has a water collector and reservoir to monitor precipitation and a float measure to activate an electronic on/off switch in series between the irrigation system and the automatic control system which controls irrigation.

SUMMARY OF THE INVENTION

A primary objective of the present invention is to measure the water precipitation and evaporation in an irrigation control area and based on that measure to allow or inhibit the activation of an irrigation system.

In accordance with the description presented herein, other objectives of this invention will become apparent when the description and drawings are reviewed.

BRIEF DESCRIPTION OF THE DRAWING

FIG. 1 illustrates a side elevation view of the water control gauge with a cut away section illustrating the mechanism.

FIG. 2 illustrates a cross sectional view of the water control gauge rotated 90 degrees from FIG. 1.

FIG. 3 illustrates a top view of the reservoir with the water collector removed.

FIG. 4 illustrates is a cross-sectional view of the siphon tube.

FIG. 5 illustrates an alternate attachment for the aperture tube.

FIG. 6 illustrates a side elevation view of an alternate embodiment of the water control gauge with a cut away section illustrating the mechanism.

FIG. 7 illustrates a cross sectional view of the alternate embodiment of the water control gauge rotated 90 degrees from FIG. 6.

DESCRIPTION OF THE PREFERRED EMBODIMENT

The water control gauge consists of a water collector mounted on a reservoir. The reservoir has a float device to measure water level in the reservoir. When a predetermined water level is reached, the float device activates an electronic open/close switch which breaks the connection between the irrigation system and the automated control unit.

Referring to FIGS. 1 through 4, a water collector (1) is mounted on a cylindrical reservoir (2). The water collector (1) is an open ended cylinder having a funnel (3) mounted therein. The funnel (3) channels water received in the water collector (1) top opening (4) into a water tube (5) which extends into the reservoir (2). The water tube (5) may be placed in a reservoir tube (6) or through a plurality of eyelets (not shown) attached to the inner wall (7) of the reservoir. The reservoir tube (6) extends to a point adjacent to the reservoir bottom (8) such that collected water entering the reservoir does not interfere with the float measurer (9).

The reservoir (2) is cylindrical in shape having an open top end and a closed reservoir bottom end (10). The float measurer (9) has a pulley (11) with a wheel (16) mounted on a shaft (12) attached to the inner wall (7) of the reservoir (2). The pulley (11) has a cord (13) with a weight (14) attached to one end and a float (15) attached to the opposite end. The cord (13) is attached to the wheel (16) to prevent slipping of the cord (13) over the wheel (16). The weight (14) serves to counterbalance the weight of the float (15) such that as water is channeled into the bottom of the reservoir (2) through reservoir tube (6), the rise in water level of water in the reservoir (2) cause the float (15) to rise turning the wheel (16) of the pulley (11).

An electric open/close switch (17) is attached to the inner wall (7) of the reservoir (2). The switch (17) is oriented such that a lever (18) attached to the switch (17) rests on a dowel (19) attached to the wheel (16). As the wheel (16) rotates due to the change in elevation of the float (15) the dowel (19) moves the dowel end of the lever (18) up and down. At the proper amount of vertical deflection the switch (17) is switched to the open position which breaks the electric connection between an irrigation system (not shown) and its automatic control unit (not shown). With the switch (17) connected in series between the irrigation system and the automatic control unit, in the open position the irrigation system can not be activated to provide water for irrigating.

The reservoir (2) also has a syphon (20) attached. The siphon tube (21) is attached to the reservoir wall (22) at an elevation to provide for measuring the amount of water desired to be maintained for irrigation purposes. For example, by experiment it has been found that irrigation for a golf course requires approximately ½ inch of water in a 24 hour period. For water excess control purposes, it has been found that between 1½ and 2½ inches should be retained to allow for evaporation before more watering. Therefore in this application the tube reservoir end (23) is attached to the reservoir wall (22) at 1½ inches from the bottom end (10) of the reservoir (2). The syphon tube (21) is bent such that its maximum elevation is 2½ inches above the bottom end (10). As water fills the reservoir (2), the float (15) will rise ½ inch vertically at which point the switch (17) opens preventing the irrigation system from providing water.

The water entering the water collector (1) may come from rain, the irrigation system itself or condensation from high humidity conditions such as fog. Once the water level in the reservoir (2) rises above 2½ inches, the syphon (20) drains the reservoir (2) down to the 1½ inch level at which point the switch (17) remains closed. When the environment conditions such as evaporation cause the water level to fall below ½ inch in the reservoir (2), the switch (17) then closes allowing the automated control unit to activate the irrigation systems to provide water until the ½ inch level is again reached. This simple measuring system prevents excess watering of an area to be irrigated which may be caused by rain or malfunction of the automated control unit.

The water control gauge will maintain a level of ½ inch or more in the reservoir (2) so that the water control gauge will be in an "off" condition unless evaporation reduces the level to less than ½ inch. In the event rain falls during a twenty four hour period before the irrigation system time control reaches the turn on time and the rainfall raises the level in the reservoir (2) above ½ inch, the water control gauge will keep the irrigation system off. This system will be in operation after the first incident of watering and will begin control with the first time the reservoir (2) has ½ inch of water.

This will allow for automatic control of watering even after very heavy rainfall exceeding 1½ inches of rain so that no watering will be allowed until the reservoir (2) level falls below ½ inch of water due to the combination of rainfall and evaporation. After very heavy rain it is possible that no automatic watering will occur for more than one or two days depending on the time of year, rainfall, evaporation, temperature and other environmental factors.

Referring to FIG. 3, the syphon (20) is attached at the tube reservoir end (23). Its U shaped elevated elbow (24) rises 1 inch from the reservoir wall (22) attachment point. The drain end (25) of the drain leg (26) of the syphon tube (21) is tapered to prevent adhesion of draining water to the drain end (25). In addition, an aperture tube (27) is suspended in the drain leg (26) to prevent adhesion of draining water in the drain leg (26) which would prevent proper syphon tube (21) operation. The aperture tube (27) is closed at the top end (28) and open at the bottom end (29) with a plurality of apertures (30) spaced longitudinally thereof. The aperture tube (27) should extend substantially the entire length of the drain leg (26) to provide an air vent to permit discharge of any slug of water which may be retained in the drain leg (26) of the syphon tube (21) at the end of a drain cycle.

The aperture tube (27) may be retained in the drain leg (26) by a strand of wire (31) or by spacers (32) with spring members (33) engaging the inner walls of the drain leg (26) as illustrated in FIG. 5.

The ratio of the wheel (16) diameter and the location of the dowel (19) on the wheel (16) compared to the movement of the lever (18) to open and close the switch (17) must be such as to reflect the ½ inch level of water in the reservoir (2) as discussed in the case of the golf course irrigation. Depending on the operational characteristics of the switch (17) selected, the ratios are determined and the flexure of the lever (18) established. Obviously other water levels for the reservoir may be selected depending on the amount of irrigation desired for the particular application.

Referring to FIGS. 6 and 7, an alternate means of mounting the water collector (1), float measurer (9) and switch (17) is illustrated. In this embodiment a mounting plate (35) is used to attach the shaft (12) of the pulley (11). The switch (17) is also attached to the mounting plate (35). The water collector (1) is attached to the top (36) of the mounting plate (35) and the water tube (5) is routed by attachment points on the mounting plate (35) to deposit water in the reservoir (2) such that it does not interfere with the float measurer (9). The mounting plate (35) is then attached to the reservoir (2).

I claim:

1. An apparatus for measuring water precipitation and controlling water irrigation comprising:
   a water collector having a means to channel water into a reservoir;
   a float measurer mounted in the reservoir comprising a wheel mounted on a shaft which is attached to an inner wall of the reservoir wherein the wheel is part of a pulley having a cord attached on the wheel with a float on one end and a weight on an opposite end;
   a switch attached to the inner wall and a lever attached to the switch wherein the lever engages a dowel on the wheel; and
   a siphon attached to a reservoir wall.

2. The apparatus as in claim 1 wherein the water collector means to channel water is a funnel contained in the water collector, a water tube attached to the funnel and the water tube inserted into a reservoir tube.

3. The apparatus as in claim 1 wherein the siphon is comprised of a siphon tube having an elbow intermediate a tube reservoir end and a drain end; the drain end in a drain leg wherein the drain end has a tapered opening relative to the longitudinal axis of the drain leg; an aperture tube contained in the drain leg with a strand of wire attached to a top end and to the reservoir; a tube bottom end which is open; and the aperture tube having a plurality of apertures intermediate the top end and the tube bottom end.

4. The apparatus as in claim 3 wherein the aperture tube retention means is a spacer having a plurality of spring members.

5. The apparatus as in claim 3 wherein the aperture tube retention means is a strand of wire attached to a top end and to the reservoir.

6. An apparatus for measuring water precipitation and controlling water irrigation comprising:
   a water collector having a means to channel water into a reservoir;
   a mounting plate having mounted thereon a float measurer comprising a wheel mounted on a shaft which is attached to the mounting plate wherein the wheel is part of a pulley having a cord attached on the wheel with a float on one end and a weight on an opposite end;
   a switch attached to the mounting plate and a lever attached to the switch wherein the lever engages a dowel on the wheel;
   the mounting plate attached to the water collector and the reservoir; and
   a siphon attached to a reservoir wall.

7. The apparatus as in claim 6 wherein the water collector means to channel water is a funnel contained in the water collector, a water tube attached to the funnel and the water tube attached to the mounting plate.

8. The apparatus as in claim 6 wherein the siphon is comprised of a siphon tube having an elbow intermediate a tube reservoir end and a drain end; the drain end in a drain leg wherein the drain end has a tapered opening relative to the longitudinal axis of the drain leg; an aperture tube contained in the drain leg and retained by a retention means; a tube bottom end which is open; and the aperture tube having a plurality of apertures intermediate the top end and the tube bottom end.

9. The apparatus as in claim 8 wherein the aperture tube retention means is a spacer having a plurality of spring members.

10. The apparatus as in claim 8 wherein the aperture tube retention means is a strand of wire attached to a top end and to the reservoir.

* * * * *